(12) United States Patent
Eriksen

(10) Patent No.: US 8,220,728 B2
(45) Date of Patent: Jul. 17, 2012

(54) METHOD AND APPARATUS FOR SEPARATING GLASS AND PLASTIC FOILS IN LAMINATED GLASS

(75) Inventor: Bent Eriksen, Hørve (DK)

(73) Assignee: SHARK Solutions A/S, Svinninge (DK)

( * ) Notice: Subject to any disclaimer, the term of this patent is extended or adjusted under 35 U.S.C. 154(b) by 347 days.

(21) Appl. No.: 12/308,920

(22) PCT Filed: Jul. 2, 2007

(86) PCT No.: PCT/DK2007/000328
§ 371 (c)(1),
(2), (4) Date: Apr. 10, 2009

(87) PCT Pub. No.: WO2008/000273
PCT Pub. Date: Jan. 3, 2008

(65) Prior Publication Data
US 2009/0230224 A1   Sep. 17, 2009

(30) Foreign Application Priority Data
Jun. 30, 2006  (DK) ................................ 2006 00879

(51) Int. Cl.
*B02C 19/00* (2006.01)
(52) U.S. Cl. ...... 241/14; 241/19; 241/24.18; 241/24.22; 241/27; 241/188.1; 241/79.1

(58) Field of Classification Search .................. 241/14, 241/19, 24.18, 24.22, 21, 79.1, 60, 188.1, 241/73, 74, 57, 27
See application file for complete search history.

(56) References Cited

U.S. PATENT DOCUMENTS

| 3,004,721 A | 10/1961 | Notzold |
| 3,946,953 A * | 3/1976 | Hato ............................ 241/79.2 |
| 5,505,390 A | 4/1996 | Rodgers |
| 5,984,216 A | 11/1999 | Andela et al. |

FOREIGN PATENT DOCUMENTS

| GB | 1 397 674 | 6/1975 |
| JP | 11/197605 | 7/1999 |
| JP | 2002/326849 | 11/2002 |
| WO | WO 2005/056192 | 6/2005 |

* cited by examiner

*Primary Examiner* — Mark Rosenebaum
(74) *Attorney, Agent, or Firm* — James Creighton Wray

(57) ABSTRACT

In a facility and a method for separating glass residues from PVB-film, comminuted material is passed through several process steps, where treating with beaters (12) in a chamber (2) is effected in one of the first steps. At the discharge end (18) of the chamber there is arranged a separation, as heavy particular material can be discharged through a perforated bottom section (19) in the chamber (2). Through an air inlet (22) at the side (15) of the chamber, air is drawn in induced by a ventilator-like impeller rotor (28) drawing air in through a central opening (26) spaced apart from the bottom section (19). Thereby, light film-like materials are carried away from the heavy particles.

10 Claims, 6 Drawing Sheets

METHOD AND APPARATUS FOR SEPARATING GLASS AND PLASTIC FOILS IN LAMINATED GLASS

This application claims the benefit of Danish Application No. PA 2006 00879 filed Jun. 30, 2006 and PCT/DK2007/000328 filed Jul. 2, 2007, which are hereby incorporated by reference in their entirety.

FIELD OF THE INVENTION

The invention concerns a method and an apparatus for separating glass and plastic film in laminated glass, in particular windshields for cars.

BACKGROUND OF THE INVENTION

Machines for crushing laminated glass panes are known. Such a crushing machine is disclosed in U.S. Pat. No. 5,984,216 which indicates a closed crushing chamber containing a rotatable shaft with pivotable beaters or hammers which are distributed along the shaft in the crushing chamber. The glass is fed into the chamber through a slot and is broken to pieces by the impact of the hammers against the glass edge. Thereby, the glass is broken into pieces and separated from the plastic film interposed between the glass layers in the panes. The material so comminuted consists partly of particles or pieces of clean glass, of pieces of plastic film and of pieces of plastic film with some glass sitting on it, and is discharged through the bottom of the chamber by the force of gravity. Then a finishing treatment is performed with a sieve where pieces of plastic film are separated from particular pieces of glass. In the crushing machine thus described, film elements with glass on them will be discharged together with clean glass pieces.

OBJECT OF THE INVENTION

One aspect of the invention is to provide a method and a facility that may aftertreat comminuted material from laminated glass panes so that separation of glass and plastic film may be effected to a higher degree. It is also the intention to provide a method and a facility which has great capacity and provides a large degree of purity in the plastic film separated off which is of the type PVB having a high recycling value.

DESCRIPTION OF THE INVENTION

The invention provides a method for separating glass and plastic film from previously comminuted laminated glass, including processing comminuted material which is passed through at least one process step,
  where in a first process step, the comminuted material is treated by rotating beaters in at least one first chamber;
  where in the chamber there is effected a separation of heavier, particular materials which fall through a perforated section at the bottom of the chamber and moved away in a separate channel;
  where an airflow is produced through the first chamber for carrying away lighter, particularly film-like, materials towards an opening arranged spaced apart from the bottom of the first chamber.

Furthermore, the invention provides a facility for separating glass and plastic film from previously comminuted laminated glass, including a mainly cylindric chamber with a through-going, substantially horizontally extending, rotatable shaft having beaters provided pivotably at the ends of arms that extend substantially radially from the shaft, the arms arranged mutually so that they form a mainly helical pattern along the shaft, where the chamber is provided with inlets for comminuted material at one end and with separate outlets for separated materials at its other end, as a first outlet for heavier, especially particular, material is provided as a perforated section at the bottom of the chamber, and a second outlet for lighter, especially film-like, material is provided in the form of an opening spaced apart from the bottom of the chamber, and where means are provided for producing an airflow out of the chamber through the opening.

By the invention comminuted laminated glass, e.g. processed by prior art apparatuses, is introduced into the first chamber where material is worked by beaters or hammers in a known way. The helical arrangement of the beaters along the shaft enables conveying the material by the movement of the arms and beaters and by the airflow induced thereby. When the beaters strike the comminuted glass laminate, glass particles are released from the plastic film. Due to their shape and weight, glass and other particular and heavier materials will seek down towards the bottom of the chamber. The particular material may here be extracted through the perforated section at the bottom of the chamber. At the same time, the perforated section retains film pieces and similar lighter materials that cannot pass through the perforation. Instead, the lighter materials, in particular pieces of PVB-film, are carried towards the opening at the bottom of the chamber.

By the method it is preferred that air is introduced through an air inlet in the chamber at the side of the perforated element and further through the opening spaced apart from the bottom of the first chamber. The flow of lighter material towards the opening is thereby assisted, and the separation of particular glass and film-like plastic pieces is thereby enhanced.

It is preferred that the airflow is induced via an impeller rotor or the like, e.g. blades fitted on the shaft of the beaters and functioning as a radial flow ventilator, and which is disposed in a second chamber adjacent to the first chamber. Thus an airflow may be formed from the first chamber and into the second chamber, as the impeller wheel sucks in air towards its centre and flings it out against the side of the second chamber.

Moreover, it is preferred that by the method there is effected a treatment of the off-separated materials in a water bath in one or more steps. It is preferred that in a further process, the light materials are passed obliquely upwards through a screw conveyor under simultaneous flushing with water. This screw conveyor is arranged in an inclining outer tube, where the shaft bearing the screw is hollow and perforated along most of its length for supplying process water during operation, as materials can be conveyed upwards from the lower end of the conveyor to its upper end, and where the outer tube has a perforated area along at least part of its lower side, the perforated area being surrounded by a channel element connected to a line for conducting used process water to a settling tank.

THE DRAWING

Preferred embodiments of the invention are described in detail below with reference to the drawing, in which:
  FIG. 1 shows a facility according to the invention in a first perspective view;
  FIG. 2 shows the same as FIG. 1 in a second perspective view;
  FIG. 3 shows a partly sectional perspective view of a first and a second chamber in the facility;
  FIG. 4 shows a perspective view of parts of the discharge end of the second chamber;

DESCRIPTION OF THE PREFERRED EMBODIMENTS

Figure 1:
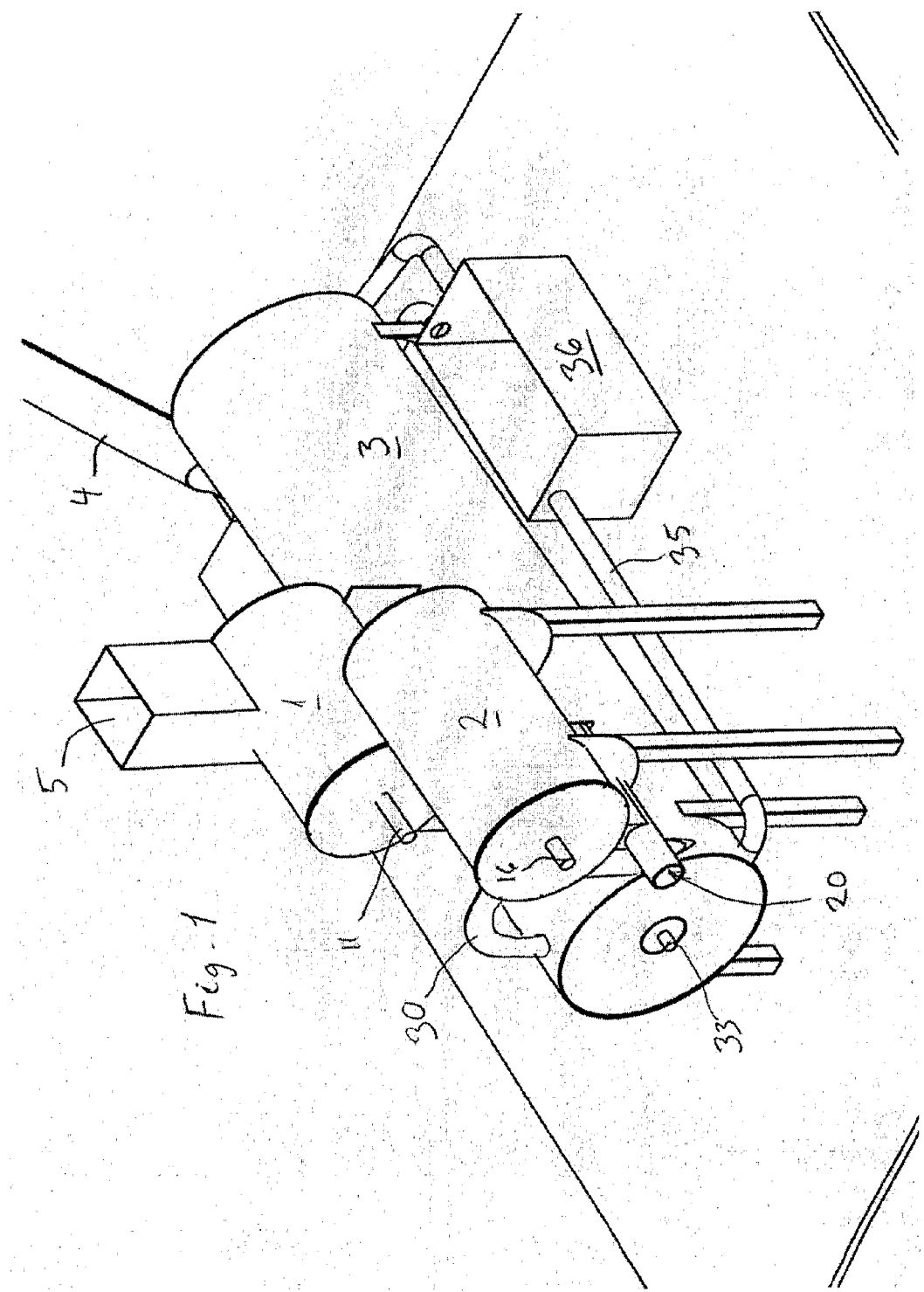
Figure 2:
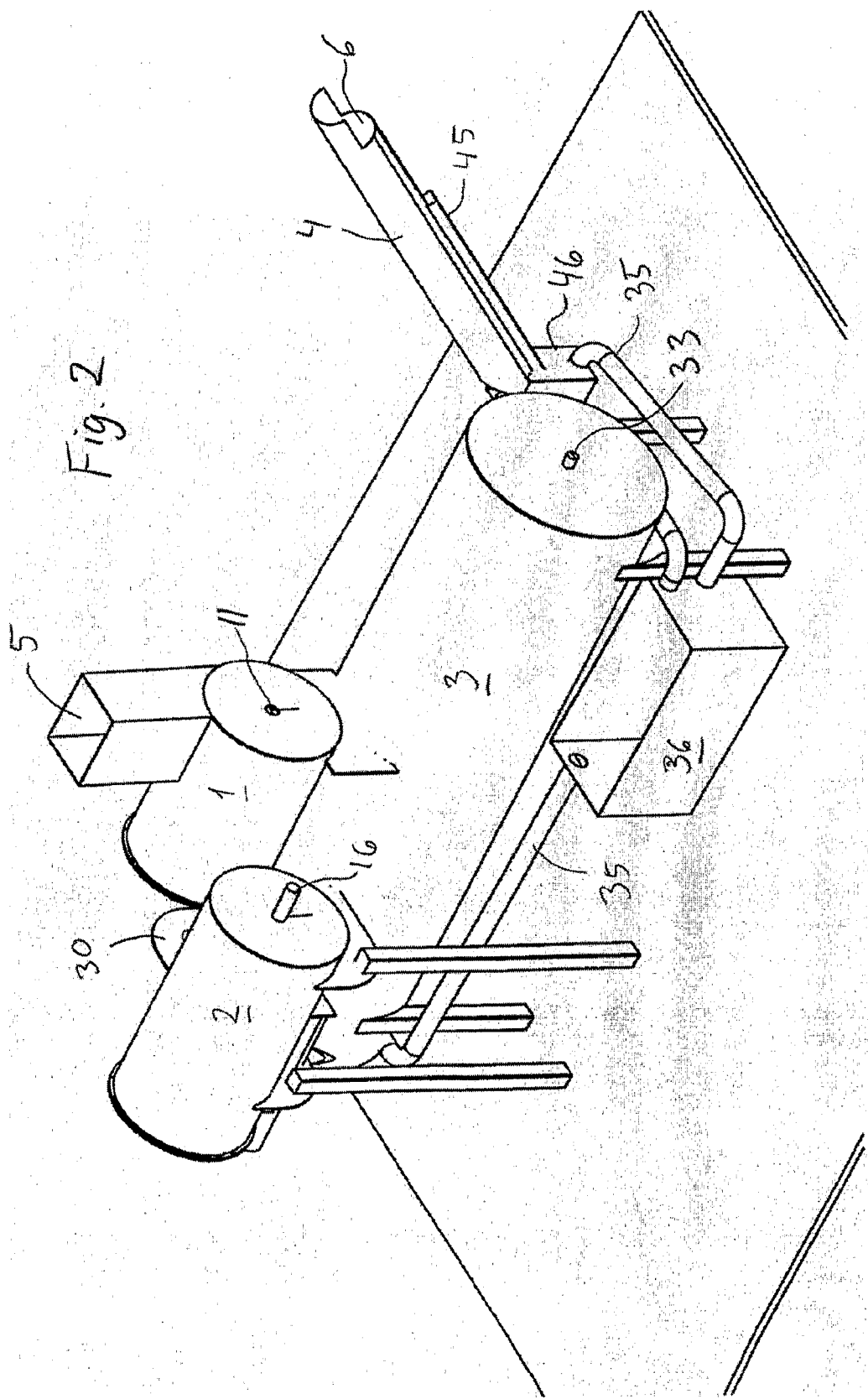
Figure 3:
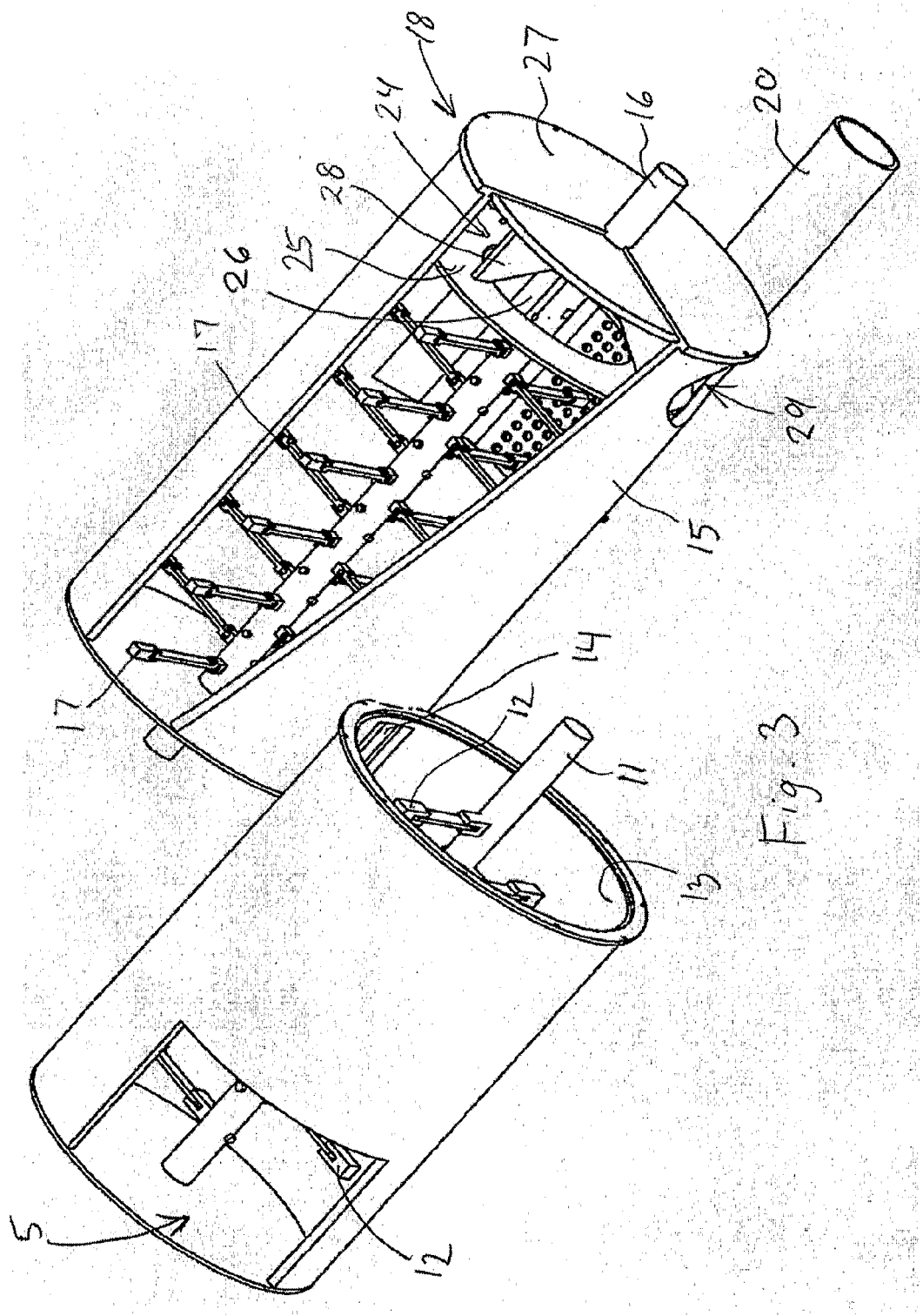

A preferred embodiment of the facility according to the invention as shown on FIGS. 1 and 2 may consist of four main components: a first process chamber 1, a second process chamber 2, an approximately horizontal washing drum 3 and an upwards inclining screw conveyor 4. Comminuted laminated glass produced by a not shown previous process is fed to a funnel or inlet 5 in the facility in chamber 1 and then passes all steps, as glass and other particles are separated off in chamber 2, in the drum 3 and the screw conveyor 4, after which cleaned PVB film pieces are discharged, possibly together with some process water at the outlet 6. Each of the four main components 1, 2, 3, 4, which each correspond to four main process steps in the process, has shafts driven by not shown motors. In principle, the four main process steps may be described as coarse comminution of the material in chamber 1, finer comminution of material and separating off heavy particles in chamber 2, washing and mechanical treating of conveyed material in the form of film pieces and light materials in water in washing drum 3, and finally flushing with water in the specially designed screw conveyor 4, respectively.

The first chamber 1 is drum-shaped and provided in a known way with a shaft 11 with beaters 12 that are distributed along the shaft 11 in a helical pattern. The cylindric inner wall 13 of the chamber 1 is smooth, and by rotation of beaters 12 there is effected conveying of the material in addition to comminution, the material being introduced through the inlet 5 in direction towards the end opposite the inlet 5. The chamber 1 has an outlet opening in the wall 13 in the shape of a slot 14 leading into chamber 2. By random movement and by a pressure difference to be explained later, comminuted material will continue through the opening 14 to chamber 2, as the wall 15 on chamber 2 bears against chamber 1.

Figure 4:
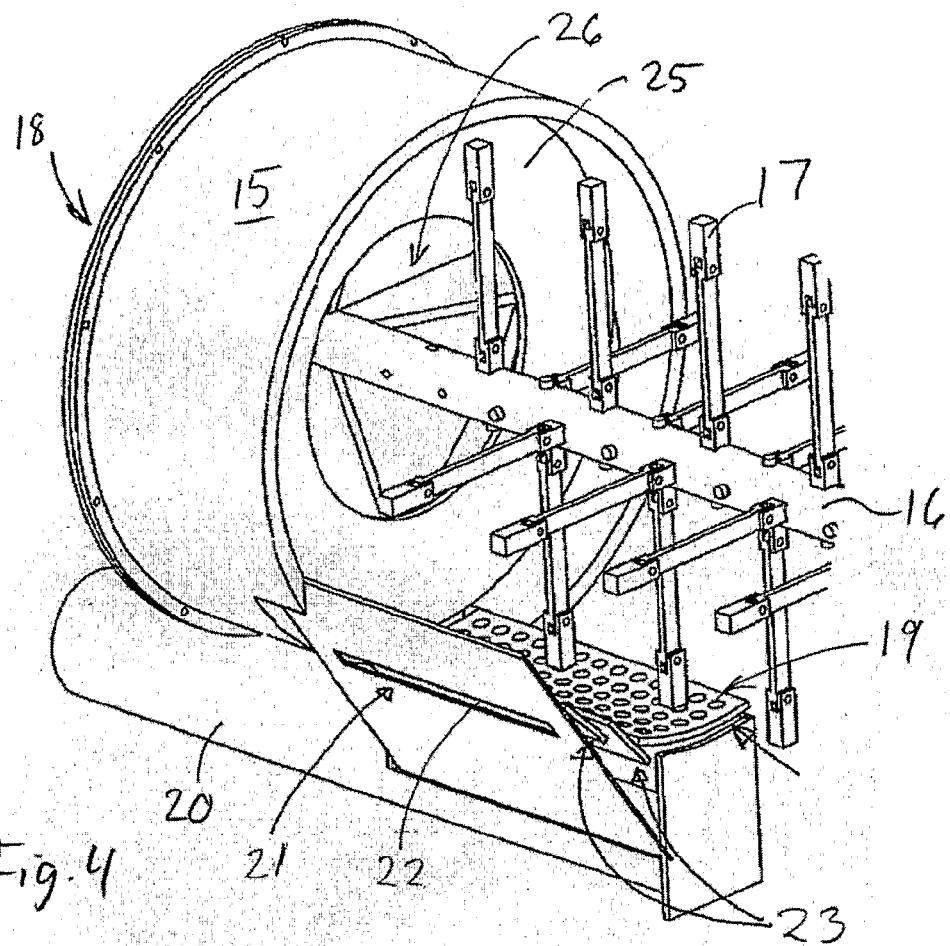
Figure 5:
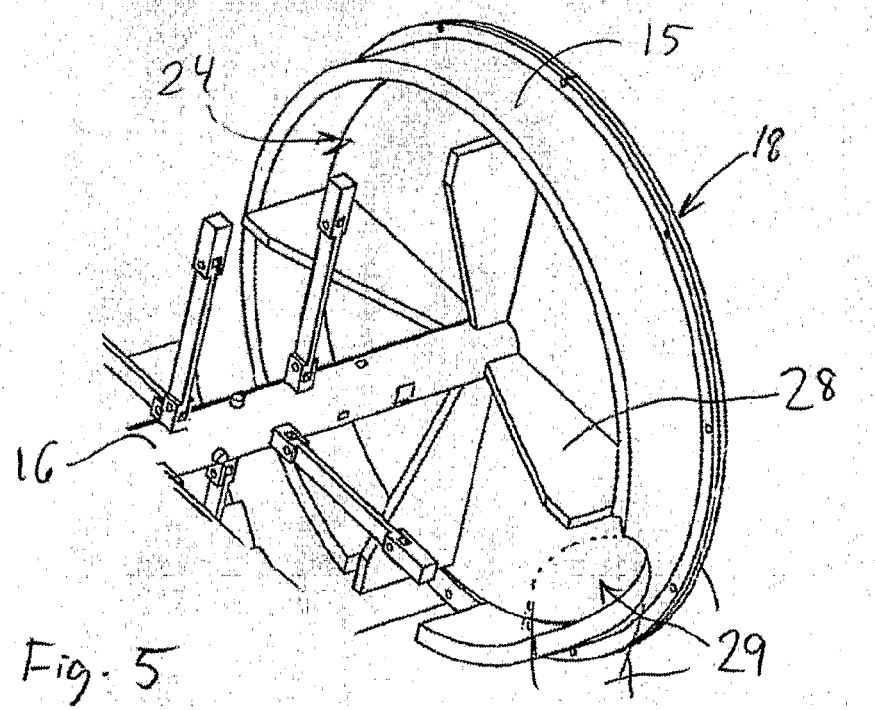
FIG. 5 shows in perspective view a ventilator element at the discharge end of the second chamber.
Figure 6:
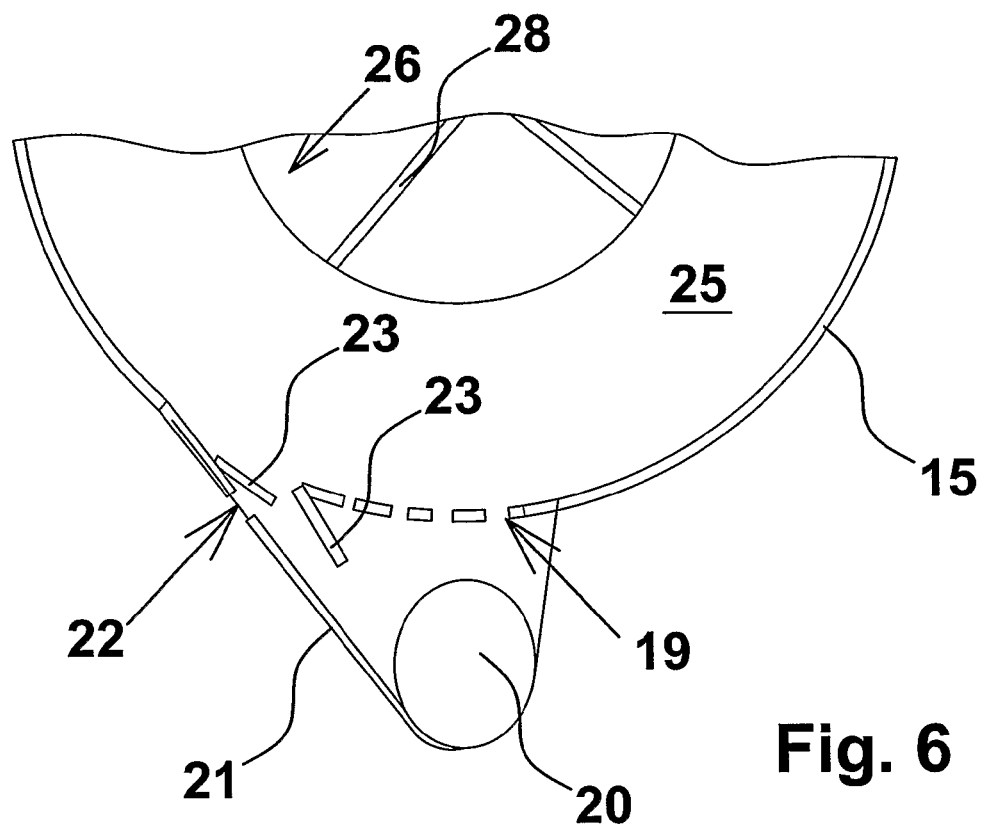
FIG. 6 shows schematically a detail of a perforated section at the bottom of the second chamber.

In a way similar to chamber 1, chamber 2 is provided with a shaft 16 carrying beaters 17 in a helical pattern, as these beaters 17 are smaller than the beaters 12 for finer comminution of the material. The chamber 2 is also cylindric and smooth at its inner side and receives the material at its inlet end and through the slot 14, whirling it around and comminuting it, as particles of glass etc. are separated from PVB film. At the outlet end 18 of chamber 2 is provided a special separating arrangement shown in detail in FIGS. 4-6.

Close to the outlet end 18, chamber 2 thus has a perforated section 19 of its bottom, preferably consisting of holes in the casing 15 of chamber 2, but other designs in the form of inserted netting or gratings may be envisaged. The essential feature is that the section 19 allows particles of a certain size to pass but no film-like pieces or parts. Under the perforated section 19 is provided a discharge channel 20 in which is seated a not shown screw conveyor. At the side of the discharge channel 20 is welded a plate 21 with a slotted air intake 22. Immediately within the air intake 22, two elongated plate pieces are provided which operate as gill-like guide plates 23 for air. One of the guide plates 23 is adjustable, i.e. may be tilted about a longitudinal axis in relation to the other fixed elements. Air may thus come in by the intake 22, be directed downwards by the first guide plate 23 and then upwards along the inner side of the cylindric wall 15 in the chamber 2. In the example, only one air intake is shown; more are possible, e.g. disposed symmetrically around the channel 20.

The rear part or portion 24 of the chamber 2, i.e. the part closest to the outlet end 18, is partly separated from the remaining part of the chamber by an annular partitioning 25. The partitioning 25 simultaneously forms a limit to the perforated section 19. Hereby is formed a circular opening 26 in the wall 25 through which the shaft 16 extends up to the plane rear wall 27. At the extreme end of the shaft 16 and closest to the wall 27, radially extending blades 28 are mounted; these may be straight, as shown, or in other embodiments curving and possibly extending tangentially to the shaft 16. The blades in the portion 24 thus rotate together with the beaters 17. Through the part of the cylindric side wall 15 located opposite the portion 24, a hole 29 is provided spaced apart from the bottom, to which hole 29 is connected a pipe 30 communicating with the washing drum 3.

Figure 7:
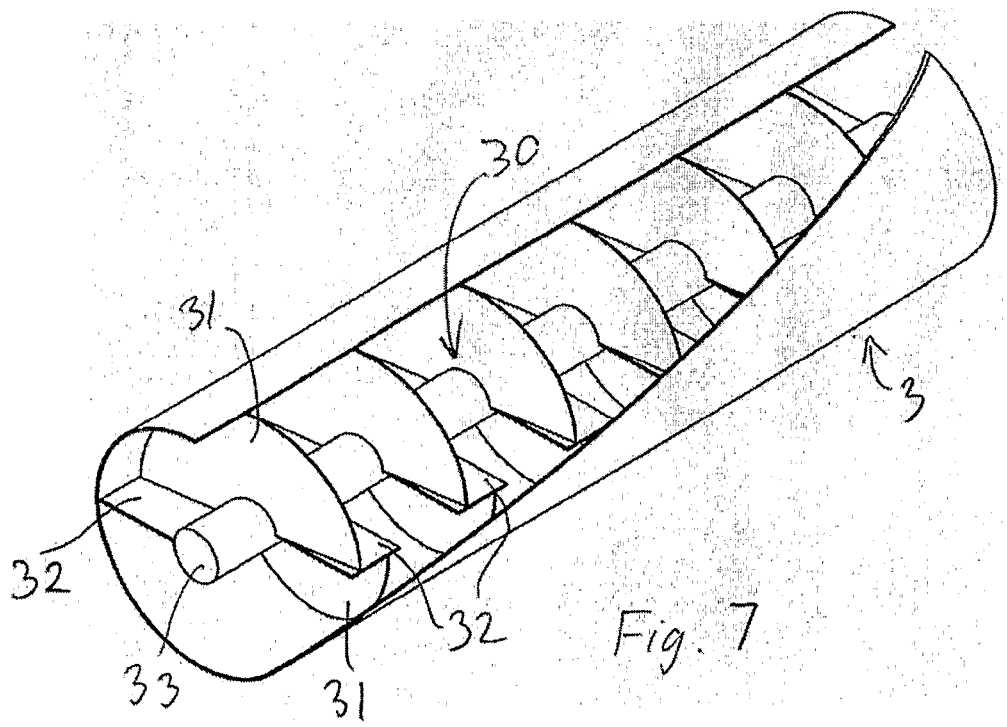
FIG. 7 shows a partly sectional perspective view of a washing drum in the facility.

The washing drum 3 is substantially horizontal and has a specially designed screw supported by a shaft 33, see FIG. 7. Apart from helical members 31, the screw is also provided with plate members 32 interrupting the helical course, and which partly act as stirring elements and partly as mechanical manipulators at their ends which have a small clearance in relation to the inner side of the casing 34 of the drum. During operation, the washing drum 3 is at least partially filled with water which is continually circulated through separate pipes 35 to a settling tank 36.

Figure 8:
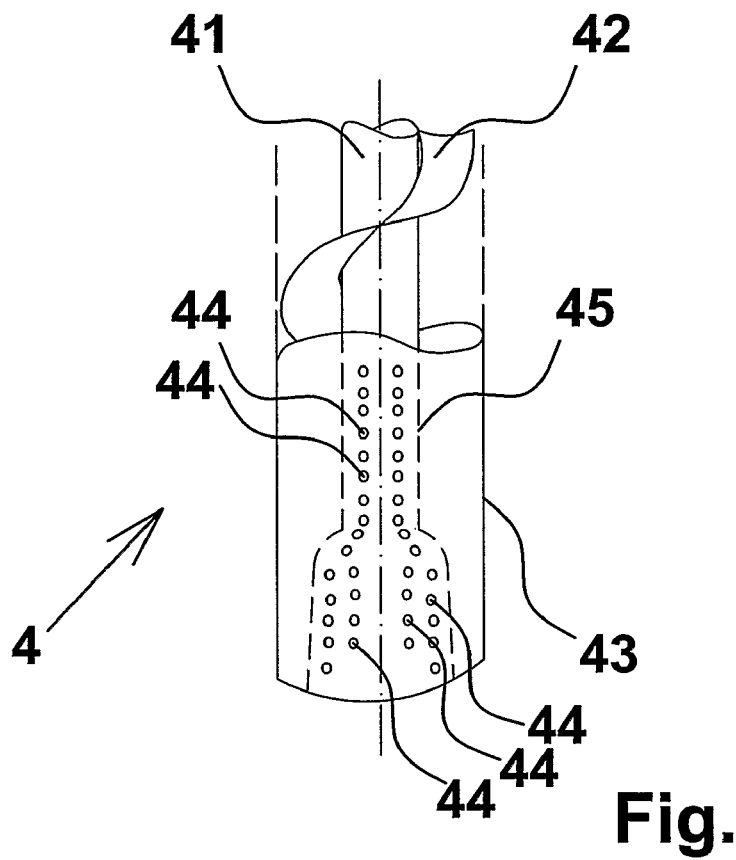
FIG. 8 shows part of a perforated screw conveyor in the facility.
Figure 9:
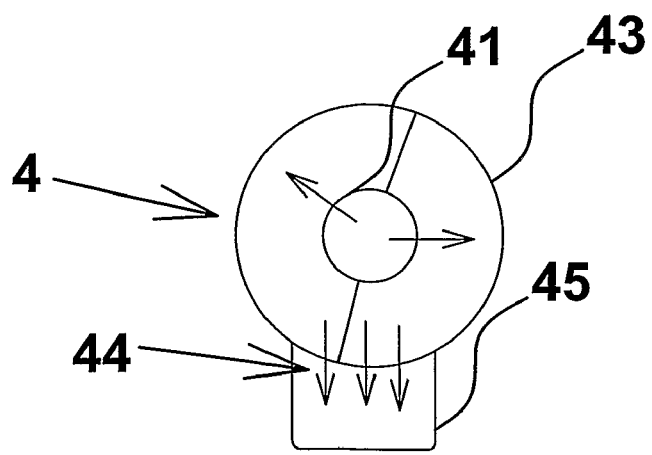
FIG. 9 shows schematically a cross-section through the screw conveyor on FIG. 8.

From the wash drum 3 there is a pipe connection to the inclining screw conveyor 4 where water and film pieces are supplied at the bottom. This conveyor 4 has a design as indicated on FIGS. 8 and 9. It consists of a hollow shaft 41 through which water is pumped in under a certain pressure. A helical screw 42 is provided around the shaft 41 in a conventional way. The shaft is evenly perforated along almost its entire length, e.g. three holes per screw convolution, so that water can run from the interior of the shaft 41 to the space between it and an outer tube 43. The outer tube 43 is in turn also perforated along a section extending along the underside of the tube from lower end and a distance up the length of the outer tube. The perforations are shown with 44 on FIG. 8. A channel element 45 with U-shaped cross-section is welded onto the outer tube 43 so that the element 45 covers the section with perforations 44, see FIGS. 2 and 9. At the base of the conveyor 4 is provided a collecting vessel 46 through which process water from the channel element 45 can be collected and conducted to the settling tank 36 via pipe 35.

The method according to the invention is preferred performed as follows:

Comminuted glass laminate from car windshields that have been crushed at a previous process, e.g. as described in U.S. Pat. No. 5,984,216, are conveyed or poured into the inlet 5 in chamber 1. The material, mainly film pieces of PVB with glass remains and particles of glass, glue etc., is crushed into lesser pieces by the beaters 12, the movement of which whirls the material around and conveys the material towards the end closest to the slot 14.

With time the comminuted material enters chamber 2 where it is further comminuted and conveyed towards the end 18. The wings 28 on the shaft 16 thereby act as a radial ventilator that sucks air in through the opening 26 and blows it out through the hole 29 at the side 15. Some of the air is sucked in through the air intake 22, up along the side of the chamber and in through the opening 26. Thereby lighter, particularly film-like, PVB residues are sucked through the opening 26. Heavier particles fall down against the perforated section 19 as the airflow from the slot between the guide plates 23 is directed away from the area above the section 19. Heavy particles may thus more readily fall down through the section 19 and be moved away through the channel 20.

In one variant of the process in chamber 2 pressurised air or vacuum may be supplied to the chamber in order to assist the airflow.

The light material let out through the hole 29 is conducted through the pipe section 30 to the washing drum 3. In the drum 3 the PVB film is washed and worked as glass and glue residues are torn off the film by friction, in particular by the free ends of the radial plate elements 32 and by the mutual movement of film pieces. The retention time in the drum 3 for the film material is typically some minutes. The process water in the drum 3 is recirculated through the settling tank 36 where the solid particles are precipitated from the process water.

After the washing drum 3, the film material is conveyed to final treatment in the screw conveyor 4. The material is moved by the screw blades 42 upwards against the outlet end 6. During the transport, the material is flushed by water running out of the perforated shaft 41 and further on through the perforations 44 and away inside the channel element 45. The process water thus used is passed through the settling tank 36 and is thereby cleaned from particles of glass, glue, metal etc. The cleaned and comminuted PVB material may then be taken out at the outlet end 6 for recycling.

It is possible to vary the method and the facility within the scope of the invention. E.g. chamber 1 may be envisaged omitted so that crushed material can be moved directly to chamber 2.

The invention claimed is:

1. A method comprising separating glass and plastic film from previously comminuted laminated glass, including processing comminuted material which is passed through at least one process step,
where in a first process step, the comminuted material is treated by rotating beaters in a first chamber;
where in the first chamber there is effected a separation of heavier, particular materials which fall through a perforated element at the bottom of the first chamber and moved away in a separate channel; and
where an airflow is produced through the first chamber for carrying away light film, materials towards an opening spaced apart from the bottom of the first chamber.

2. Method according to claim 1, wherein air in the airflow is introduced through an air inlet at the side of the first chamber, the air flows across the perforated element and further on through the opening spaced apart from the bottom of the first chamber.

3. Method according to claim 1, wherein the airflow through the opening is produced or supported by an impeller rotor provided in a second chamber adjacent to the first chamber, a rotational axis of the rotor pointing towards the opening, and where light film materials are carried out of the second chamber through a second opening at the side of the second chamber.

4. Method according to claim 3, wherein the light film materials are washed and treated mechanically by being rotationally conveyed in water.

5. Method according to claim 4, wherein the light film materials are conveyed obliquely upwards through a screw conveyor in a tube while simultaneously being flushed with water, and the water is withdrawn from the screw conveyor through a perforated section at a lower side of the screw conveyor.

6. A facility for separating glass and plastic film from previously comminuted laminated glass, including a mainly cylindric first chamber with a through-going, substantially horizontally extending, rotatable shaft having beaters provided pivotably at the ends of arms that extend substantially radially from the shaft, the arms being arranged mutually so that the arms form a mainly helical pattern along the shaft, where the first chamber is provided with inlets for comminuted material at one end of the first chamber and with separate outlets for separated materials at a second end of the chamber, the outlets having a first outlet for heavier particular material provided as a perforated section at a bottom of the first chamber, and a second outlet for light material provided in the form of an opening spaced apart from the bottom of the chamber, and where means are provided for producing an airflow out of the chamber through the opening, wherein the means for producing the airflow out of the first chamber through the opening includes an impeller rotor or fan wheel which is disposed in a second chamber adjacent to the first chamber, the axis of rotation of the rotor or wheel pointing to the opening which is disposed in a wall separating the first chamber and the second chamber so that the light materials can be carried with the airflow out of the second chamber through at least one second opening provided in a side of the second chamber.

7. Facility according to claim 6, wherein the means for producing an airflow out of the first chamber through the opening includes at least one air inlet which is provided in a side of the first chamber, and which allows air to be sucked into the first chamber and to be conducted towards the opening spaced apart from the bottom of the first chamber.

8. Facility according to claim 7, wherein gill-like guide plates for air are disposed at the at least one air inlet in such a way that the airflow is directed upwards along the side of the first chamber.

9. Facility according to claim 6, wherein for processing light materials treated in the first chamber and the second chamber, there is provided a washing drum which is disposed largely horizontally, and which is provided with a helical conveying and washing means with radial wing blades for stirring and mechanically treating the materials in a water bath during the conveying of materials from a washing drum inlet opening at one end of the washing drum to an outlet opening at an opposite end of the washing drum.

10. A facility for separating glass and plastic film from previously comminuted laminated glass, including a mainly cylindric chamber with a through-going, substantially horizontally extending, rotatable shaft having beaters provided pivotably at the ends of arms that extend substantially radially from the shaft, the arms being arranged mutually so that the arms form a mainly helical pattern along the shaft, where the chamber is provided with inlets for comminuted material at one end of the chamber and with separate outlets for separated materials at a second end of the chamber, the outlets having a first outlet for heavier particular material provided as a perforated section at a bottom of the chamber, and a second outlet for light material provided in the form of an opening spaced apart from the bottom of the chamber, and where means are provided for producing an airflow out of the chamber through the opening, where for processing light materials which are treated in the first chamber and the second chamber there is provided an upwards inclining screw conveyor mounted in an outer tube, where a shaft bearing the screw conveyor is hollow and perforated along most of its length for supplying process water during operation, as the light materials are conveyed upwards from a lower end of the screw conveyor to its upper end, and where the outer tube has a perforated area along at least one section of its lower side, the perforated area being surrounded by a channel element connected to a line for removing used process water to a settling tank.

* * * * *